US012719226B2

(12) United States Patent
Sirasanagandla et al.

(10) Patent No.: US 12,719,226 B2
(45) Date of Patent: Aug. 25, 2026

(54) SYSTEM AND METHOD FOR DISCONNECTING A CHARGE CABLE FROM AN ELECTRIC VEHICLE

(71) Applicant: FCA US LLC, Auburn Hills, MI (US)

(72) Inventors: Uday K Sirasanagandla, Rochester Hills, MI (US); William M Burkmyre, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 102 days.

(21) Appl. No.: 18/641,835

(22) Filed: Apr. 22, 2024

(65) Prior Publication Data

US 2025/0329976 A1 Oct. 23, 2025

(51) Int. Cl.
*H01R 43/26* (2006.01)
*B60L 53/16* (2019.01)
*E05B 77/22* (2014.01)
*E05B 81/56* (2014.01)

(52) U.S. Cl.
CPC ............. *H01R 43/26* (2013.01); *E05B 77/22* (2013.01); *E05B 81/56* (2013.01); *B60L 53/16* (2019.02); *H01R 2201/26* (2013.01)

(58) Field of Classification Search
CPC ...................................................... H01R 43/26
See application file for complete search history.

(56) References Cited

U.S. PATENT DOCUMENTS 10,431,032 B2 * 10/2019 Falk ........................ G07C 11/00
12,286,020 B2 * 4/2025 Nabizada ................ B60L 53/62
2020/0412053 A1 12/2020 Alobaidan
2023/0107766 A1 * 4/2023 Aoki ........................ B60L 53/16 174/67
2023/0158902 A1 * 5/2023 Vega ........................ B60L 53/16 439/352
2025/0249908 A1 * 8/2025 Swartz .................... B60L 53/30

FOREIGN PATENT DOCUMENTS

DE 102013107645 A1 1/2014

OTHER PUBLICATIONS

Ziegler-Z6 rescue and fire fighting vehicle: <https://youtube.com/shorts/5fNSsgzfzS4?si=ych7fmuGYM6K656Y>.
Camping Van: <https://youtu.be/UgV0iTOU5gU?si=kcOsqLnRKmMFjMIf>.
Auto eject demonstration: <https://youtu.be/_cEu5AXF0is?si=rPH1b-7DSNvRKfOw>.
Super Auto Eject System: <https://youtu.be/jdDhgJs5lbE?si=0QcCJoBdtHQqkyDt>.
Blue Sear Systems Sure Eject: <https://youtu.be/_IMD54RTaxU?si=UO-2WIX-8r4xxyYU>.

(Continued)

*Primary Examiner* — Christian Chace
*Assistant Examiner* — Minato Lee Horner
(74) *Attorney, Agent, or Firm* — Jeremy J. Klobucar

(57) ABSTRACT

A release system for an electric vehicle includes an ejector actuator, a connector latch actuator having a latched position and an unlatched position, a user interface generating a release signal and a controller coupled to the ejector actuator, the connector latch actuator, and the user interface. The controller, in response to the release signal, unlatches the connector latch actuator and controls the ejector actuator to eject a charging connector from a vehicle connector.

12 Claims, 3 Drawing Sheets

(56) References Cited

OTHER PUBLICATIONS

Blue Sea Systems—Innovative Electrical Systems-Built to last website <https://wwwbluesea.com/products/7851//Sure_Eject_-_20A> (downloaded Apr. 1, 2024).
How It Works-Dev-Purkeys website <https://purkeys.net/how-it-works-dev/> (downloaded Apr. 1, 2024).
Auto Reel With Auto Safe, Kussmaul website <https://kussmaul.com/091-220-20-120-AS> (download Apr. 18, 2024).
Q-Reel's auto eject and retractable cable system <https://www.q-reel.com/products/q-reel?variant=40281153372299> (downloaded Apr. 18, 2024).
Antares Self-eject Inlet Systems, Automatic Safety Protected Vehicle Inlet Systems <http://www.antares.co.uk/uploads/6/2/3/7/6237885/pub215-www-self-eject-inlet-systems.pd> (downloaded Apr. 18, 2024).
Kussmaul's Cord Ejection Systems; <https://covepro.ca/wp-content/uploads/Kussmaul-Unites-d-ejection.pdf> (downloaded Apr. 18, 2024).

* cited by examiner

SYSTEM AND METHOD FOR DISCONNECTING A CHARGE CABLE FROM AN ELECTRIC VEHICLE

FIELD

The present disclosure relates to charging or discharging an electric vehicle and, more specifically, to a method and system for rapidly disconnecting the vehicle from a connector in time critical circumstances.

BACKGROUND

This section provides background information related to the present disclosure which is not necessarily prior art.

Electrified vehicles require charging from a battery charger. The battery charger has a cable with a connector that is fastened to the vehicle. Many people install battery chargers in a garage. Public charges are often used for charging as well. Public chargers do not have the security of a home environment. Electrified vehicles follow this same behavior when discharging energy through the vehicle connector. Some examples are features known as, but not limited to, Vehicle to Home (V2H), Vehicle to Vehicle (V2V), and Off Board Power Panel (V2L). The method and system for rapidly disconnecting the vehicle from a connector in time critical circumstances is the same whether the vehicle is charging or discharging energy through the vehicle connector.

Time critical circumstances may require the vehicle to be disconnected quickly. Stepping out of the vehicle takes valuable time. For example, an emergency vehicle operator may waste valuable time in reaching a critical destination when disconnecting the vehicle from the charger. Other situations may occur when in an uncomfortable setting such as when undesired people or animals are present, or the vehicle is in an undesired place. Stepping out of the vehicle to disconnect from the charger may not be an option.

There are known systems that eject a charging cord when the vehicle is turned on. However, none are operably controlled by the operator.

SUMMARY

This section provides a general summary of the disclosure and is not a comprehensive disclosure of its full scope or all of its features.

The present disclosure provided a system for disconnecting and ejecting a charging connector from the vehicle when desired by the vehicle operator.

In one aspect of the disclosure, a release system for an electric vehicle includes an ejector actuator, a connector latch actuator having a latched position and an unlatched position, a user interface generating a release signal and a controller coupled to the ejector actuator, the connector latch actuator, and the user interface. The controller, in response to the release signal, unlatches the connector latch actuator and controls the ejector actuator to eject a charging connector from a vehicle connector.

In another aspect of the disclosure, a method includes generating a release signal at a user interface, in response to the release signal, unlatching a connector latch actuator and in response to the release signal, controlling an ejector actuator to eject a charging connector from a vehicle connector.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
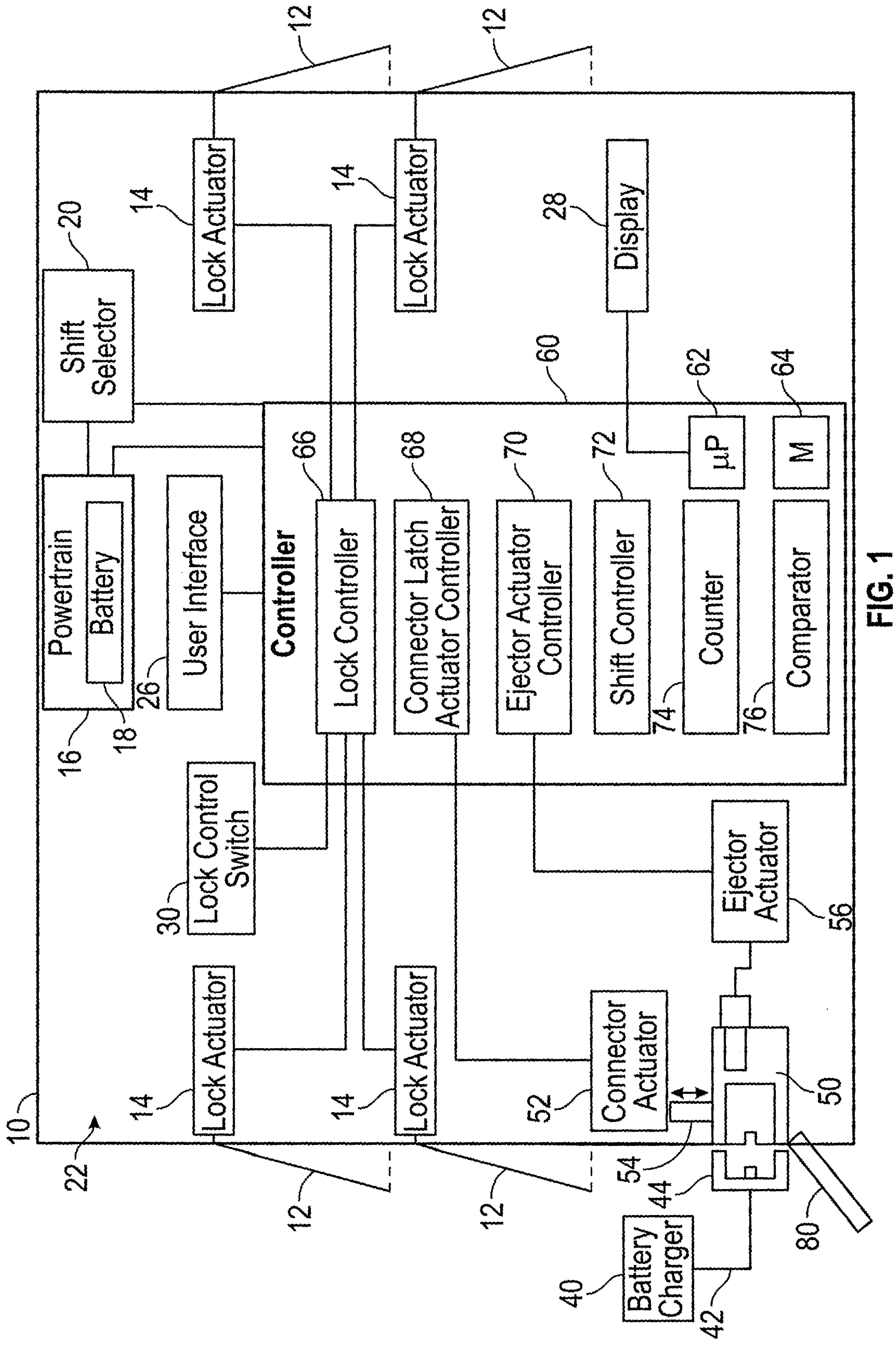
FIG. 1 is a diagrammatic view of a motor vehicle coupled to a battery charger.

Referring now to FIG. 1, an automotive vehicle 10 has a plurality of passenger doors 12 that are secured in a locked position by a lock actuator 14.

The vehicle 10 further includes a powertrain 16. The powertrain 16 is an electric or at least partially electric powertrain. The powertrain includes a battery 18 that is to be recharged. The powertrain 16 may be referred to as a battery electric powertrain or a hybrid electric powertrain. The powertrain 16 may include an internal combustion engine for a hybrid powertrain. The powertrain 16 is coupled to a shift selector 20 that positions the vehicle in various gears including a park gear and driving gears. The shift selector 20 may be a push button or lever operated. As is described in more detail below, the shifting function may be locked in certain conditions such as when the vehicle battery is charging.

Details of a release system 22 releasing a charge connector set forth in more detail. The vehicle 10 also includes a user interface 26. The user interface 26 may be a plurality of physical switches or buttons, or graphical buttons on a touch screen. A display 28 may be part of the user interface 26. The display 28 may be a liquid crystal display or another type of display. The display 28 is used for displaying various menus and messages to the vehicle occupants. The display 28 may therefore receive inputs from the operator which in turn are formed into control signals for controlling various functions of the vehicle as described below. By way of example, a release signal may be generated for controlling a connector release.

The vehicle 10 also includes a lock control switch 30. The lock control switch 30 is used for locking and unlocking the vehicle. That is, the lock control switch 30 may be used to control the lock actuators 14 into a locked position and an unlocked position. In the unlocked position, a door handle (not shown) may be used to open the door 12. In the locked position the door handle is prevented from opening the door.

The vehicle 10 is illustrated relative to a battery charger 40. The battery charger 40 has a cable 42 that extends therefrom. The cable 42 has a charging connector 44 that is coupled to a connector 50 of the vehicle 10. The connector 50 is used for charging the battery 18 of the vehicle or to provide power from the vehicle. Power from the vehicle may be used in, but not limited to, Vehicle to Home (V2H), Vehicle to Vehicle (V2V), and Off Board Power Panel (V2L) applications. Therefore, even though the connector 44 is referred to as a charging connector it may be used for discharging as well. The charging connector 44 may be secured to the connector 50 by a connector actuator 52. The connector actuator 52 prevents the disconnection of the charging connector 44 from the connector 50 when undesired. The connector actuator 52 may comprise various types of mechanisms including the movement of a pin by a solenoid, motor or the like. In this example, the pin 54 prevents the charging connector 44 from being disconnected from the connector 50 when at least the lock actuator 14 is locked. Control of the connector actuator 52 is described in greater detail below. The connector actuator 52 may be locked or unlocked with the door actuators in some examples. However, in an emergency situation the doors may be prevented from unlocking when the charger is disconnected.

An ejector actuator 56 is also provided in the system 22. The ejector actuator 56 may be motor operated, pin operated or the like. The ejector actuator 56 pushes the charging connector 44 when ejection is initiated by the user interface 26 as described in great detail below. The ejector actuator 56 ejects the charging connector 44 after the connector actuator 52 is disengaged from the connectors 50, 44. Ejection physically pushes the charging connector 44 out of engagement with the connector 50. When the connectors 50, 44 are disconnected, the vehicle 10 can easily be driven from the area. Preferably, the ejector actuator 56 ejects the charging connector 44 away from the vehicle 10 to allow the vehicle to drive away without running the charging connector 44 over. However, most connectors are suitable for being driven over by the vehicle 10. Examples of suitable ejector actuators 56 include but are not limited to a spring loaded mechanism and a motor driven solenoid.

The vehicle 10 and the system 22 include a controller 60 that is microprocessor based. The controller 60 has a processor 62 and a memory 64. The processor 62 may be one or a plurality of microprocessors used for controlling various functions of the vehicle. The memory 64 stores various data including thresholds, counts and instructions for performing various functions. That is, the memory 64 may be a non-transitory computer-readable medium that includes machine readable instructions that are executable by the microprocessor 62.

The controller 60 performs various functions that have been broken down into various sub-controllers. The controller 60 includes a lock controller 66 that actuates the lock actuators 14 to lock and unlock the vehicle. The lock controller 66 may act in response to the lock control switch 30. However, the control of the lock actuator 14 may be contained as described below.

The controller 60 includes a connector latch actuator controller 68. The connector latch actuator controller 68 controls the latched position (latching) and the unlatched position (unlatching) of the connector actuator 52. That is, the pin 54 or other type of actuator may be controlled to lock or secure the connectors 44, 50 and unlock the connectors 44 and 50 from being inseparably engaged. The controller 60 generates a latch signal and unlatch signal to control the connector latch actuator controller 68 in response to the release signal.

The controller 60 has an ejector actuator controller 70. The ejector actuator controller 70 is coupled to the ejector actuator 56 and controls the ejector actuator 56 by generating an ejector control signal in response to the release signal to initiate ejection of the charging connector 44 from the connector 50 and away from the vehicle.

A shift controller 72 may also be included within the controller 60. The shift controller 72 generates a shift lock signal and a shift release signal. The shift controller 72 may act in conjunction with the shift selector 20. The shift controller 72 may also be prevented from shifting when the connector latch actuator 52 is engaging the connector 50 and the connector 44 when a shift lock signal is generated. This prevents the vehicle from driving away when the connectors 44, 50 are connected together. The shift release signal enables shifting of the shift selector.

The controller 60 may also include a counter 74 for counting various events. The counter 74 may count the number of times the ejector actuator 56 is used to eject the connector 44. A comparator 76 may compare the count to a count threshold in order to activate various screens on the display 28. The comparator 76 may be used for preventing further actuation when a number of emergency actuations exceeds a count threshold.

A charge port door 80 may be disposed on the outside of the vehicle 10 to cover the connector 50 when the vehicle 10 is not charging.

Figure 2:
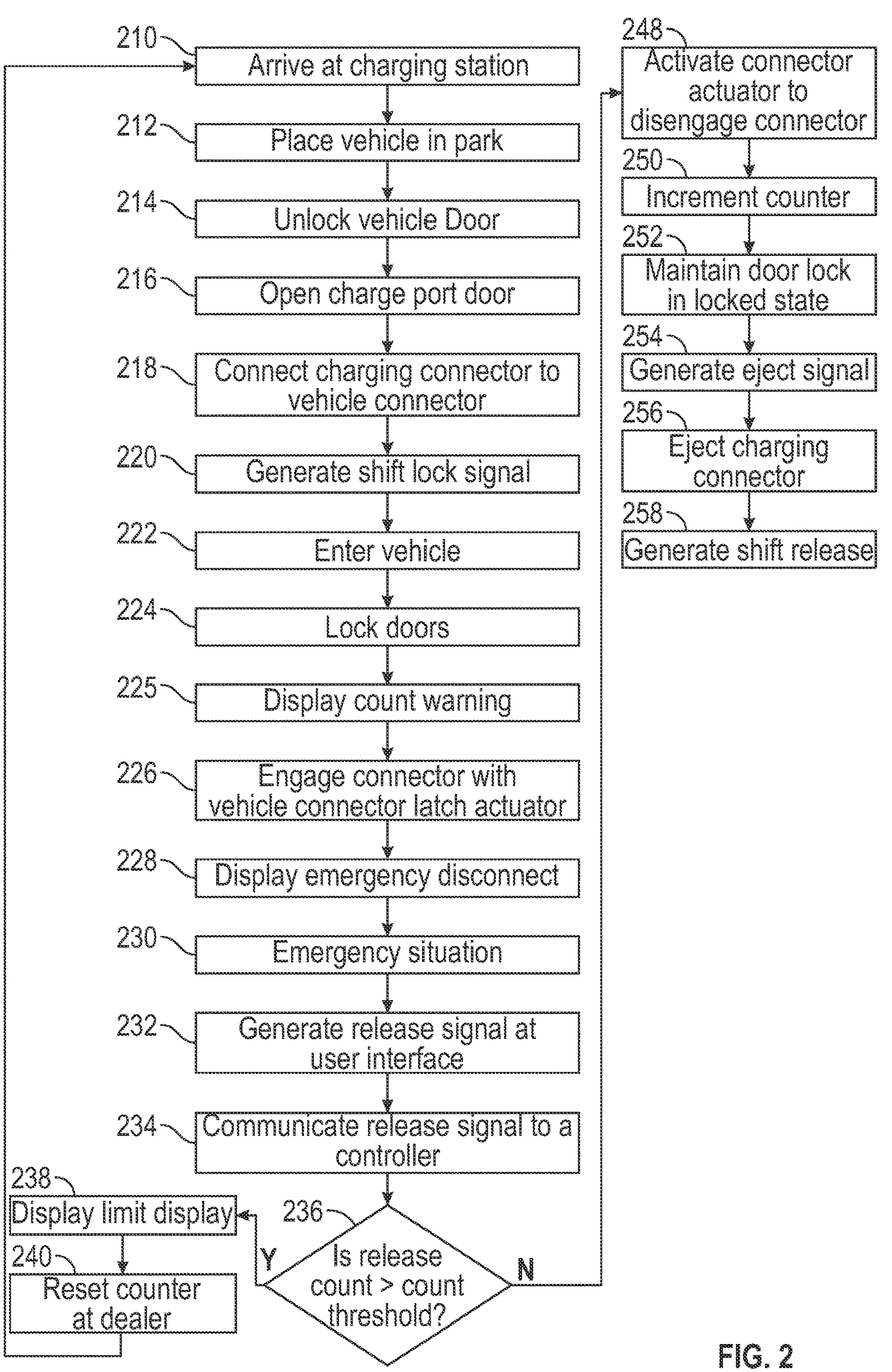
FIG. 2 is a flowchart of a method for operating the system.

Referring now to FIG. 2, a method for operating the connector release system is set forth. In step 210, the vehicle arrives at a charging station. The vehicle is placed in park by using the shift selector 20 in step 212. In step 214, the vehicle door is unlocked by actuating the lock control switch 30 to unlock the lock actuator 14 in at least one of the doors. The lock controller may control the lock actuator 14 in response to the lock control switch 30.

Figure 3A:
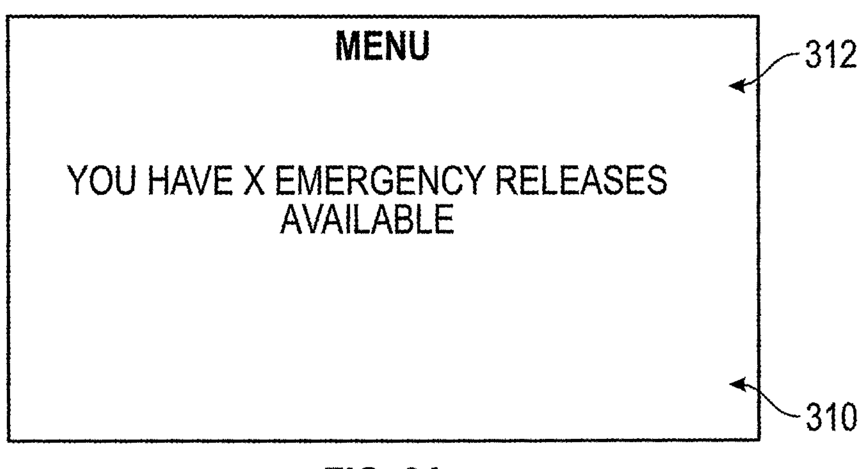
FIG. 3A is a screen display for initiating the disengagement of the charging connector.
Figure 3B:
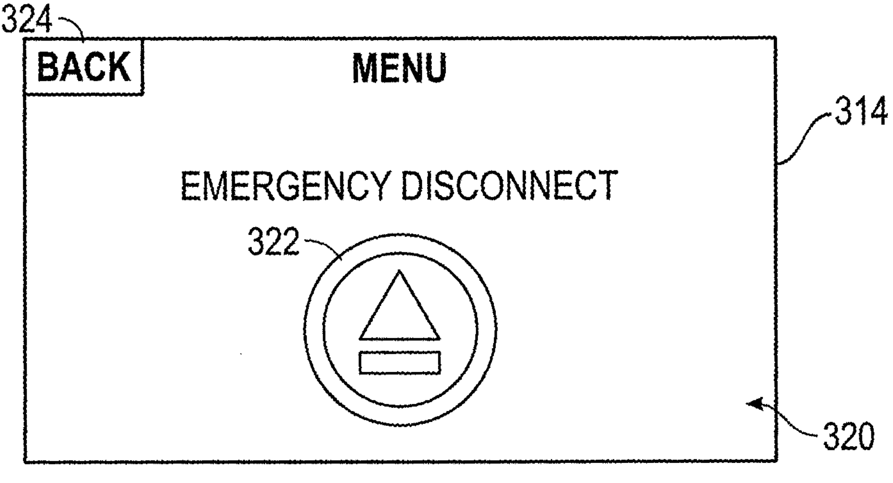
FIG. 3B is a screen display for displaying that a limit has been reached for the disengagement system.

In step 216, the occupant may open a charge port door 80 that may be used to cover the connector 50 on the vehicle. The charge connector 44 may then be connected to the connector 50 in step 218. When the connectors 44, 50 are connected, a shift lock signal may be generated by the controller to prevent the switch selector 20 from shifting the vehicle into another gear besides park in step 220. The occupant then reenters the vehicle in step 222 and locks the lock 224. By locking the doors, the connector latch actuator controllers 68 may activate the connector actuator 52 to lock the connector 50 and the charging connector 44 together using the pin 54. After step 224, step 225 displays a counter warning display such as that illustrated in FIG. 3A is set forth. In FIG. 3A, a screen display 310 displaying a count warning 312 is generated in step 225. The count warning 312 may provide a reminder to the user that the number of emergency releases is limited and that they have only so many releases available. The screen display 310 may disappear after a preset time or when the next screen display 320 of FIG. 3B is displayed. For emergency vehicles step 225 may not display since ejections may be unlimited.

In step 226, the charging connector and the vehicle connector are engaged by latching.

The display 28 may then be triggered to display an emergency disconnect screen at step 228. The emergency disconnect screen display 320 is illustrated in FIG. 3B. In this example, an emergency disconnect button 322 is displayed. A back button 324 may also be displayed to return from the screen display 320. In step 230, an emergency situation in an emergency vehicle may be to respond to an emergency assistance call. An emergency situation in a regular vehicle may be undesirable people, animals or other situations in the area of the vehicle that would prevent the operator from making a physical disconnection. In step 232, a release signal is generated at the user interface 26 in response to the touch screen 314 being selected in this example. Other types of user interfaces may be used to generate a signal. In step 234, the release signal is communicated to the controller.

Figure 3C:
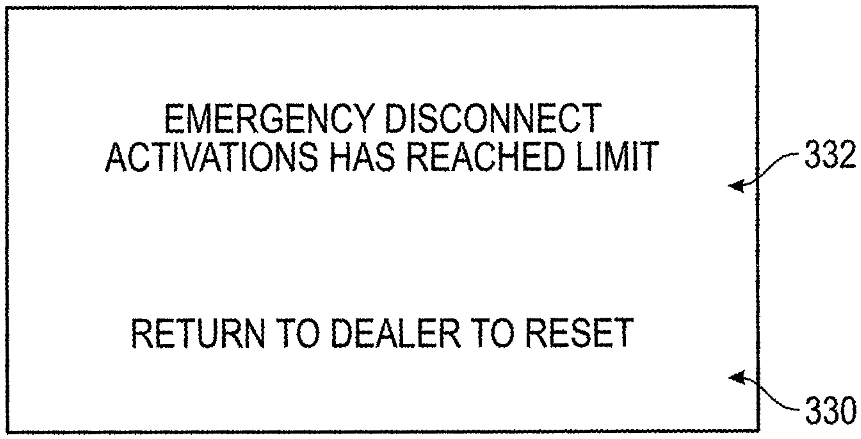
FIG. 3C is a screen display communicating the number of available emergency releases that are available.

In step 236, if the release count is greater than a count threshold, step 238 displays the screen display 330 illustrated in FIG. 3C. A limit message 332 corresponding to the limit being reached may be displayed. An informative message such as returning to the dealer for resetting the counter may also be displayed. In step 240, the vehicle may be returned to the dealer and the counter 74 may be reset by the dealer. It may be desirable to prevent continual operation of the release system for a user without penalty. For an emergency vehicle, the limit may not be used. That is, an emergency vehicle may have unlimited use of the disconnection system.

After step 236, when the release count of the number of release signals is not greater than a count threshold step 248 actuates the connector actuator 52 to disengage the connectors 44 and 50. In step 250, the counter 74 is incremented. In step 252, the door lock is maintained in the lock state. That is, disengaging the connector actuator 52 prevents the lock control 66 from unlocking the doors 12 using the lock actuators 14 when the release signal is generated. As mentioned above, typically the connector actuator 52 stays locked and unlocked based upon the position of the door lock actuator 14. In this example, however, the connector actuator 52 unlocks without the lock actuators 14 unlocking the doors for safety reasons. In step 254, an eject signal is generated at the ejector actuator controller 70 which is communicated to the ejector actuator 56. In step 256, the ejector actuator 56 ejects the charging connector 44 from engaging the connector 50. The charging connector 44 is ejected from and away from the vehicle and the connector 50. In step 258, a switch release signal is generated to allow the shift selector 20 to disengage allowing the shift selector 20 to select a desired gear such as drive or reverse. That is, the shift selector 20 is allowed to control the vehicle once the charging connector 44 is released from the connector 50.

In this manner, a normal user or an emergency user is allowed to drive the vehicle away from the charger without removing the charging connector 44 from the vehicle connector 50 by stepping out of the vehicle. That is, by using the user interface, the release signal releases and ejects the charging connector 44 away from the vehicle to allow the vehicle to drive away and operate the vehicle using the shift selector 20. By allowing the user interface 26 to be used to initiate the disengagement of the connectors, a safer and more responsive system is provided in emergency situations.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A release system for an electric vehicle comprising:

an ejector actuator;

a connector latch actuator having a latched position and an unlatched position;

a user interface generating a release signal; and a controller coupled to the ejector actuator, the connector latch actuator, and the user interface, said controller, in response to the release signal, incrementing a counter corresponding to a number of release signals since a reset, and when the counter is below a count threshold, unlatching the connector latch actuator and controlling the ejector actuator to eject a charging connector from a vehicle connector, and when the count is greater than the count threshold generating a limit message and preventing operation of the ejector actuator.

2. The release system of claim 1 further comprising a door lock actuator, in response to locking the door lock actuator, said controller controlling the connector latch actuator to the latched position coupling the charging connector to the vehicle connector.

3. The release system of claim 2 wherein said controller maintains the door lock actuator in a locked state when unlatching the connector latch actuator in response to the release signal.

4. The release system of claim 1 wherein the user interface comprises a touch screen.

5. The release system of claim 1 wherein the user interface comprises a push button.

6. The release system of claim 1 wherein the controller generates a shift lock signal after a connector latch signal.

7. The release system of claim 1 wherein the controller generates a shift release signal to enable a shift selector after controlling the ejector actuator.

8. A method comprising:

generating a release signal at a user interface;

in response to the release signal, incrementing a counter corresponding to a number of release signals since a reset;

when the counter is below a count threshold, unlatching a connector latch actuator;

in response to the release signal, controlling an ejector actuator to eject a charging connector from a vehicle connector; and when the count is greater than the count threshold, generating a limit message and preventing operation of the ejector actuator.

9. The method of claim 8 further comprising locking a door lock actuator; and, in response to locking the door lock actuator, controlling the connector latch actuator to the latched position and controlling the connector actuator to latch the charging connector to the vehicle connector.

10. The method of claim 9 further comprising maintaining the door lock actuator in a locked state lock when unlatching the connector latch actuator in response to the release signal.

11. The method of claim 8 further comprising generating a shift lock signal after a connector latch signal.

12. The method of claim 8 wherein generating a shift release signal to enable a shift selector after controlling the ejector actuator.

* * * * *